United States Patent [19]
Lew

[11] Patent Number: 5,186,056
[45] Date of Patent: * Feb. 16, 1993

[54] VORTEX FLOWMETER WITH DUAL VORTEX SENSORS

[76] Inventor: Hyok S. Lew, 7890 Oak St., Arvada, Colo. 80005

[*] Notice: The portion of the term of this patent subsequent to Jan. 22, 2008 has been disclaimed.

[21] Appl. No.: 768,365

[22] Filed: Sep. 30, 1991

Related U.S. Application Data

[63] Continuation-in-part of Ser. No. 605,533, Oct. 29, 1990, Pat. No. 5,095,760, which is a continuation-in-part of Ser. No. 348,602, May 8, 1989, abandoned.

[51] Int. Cl.$^5$ ............................................. G01F 1/32
[52] U.S. Cl. ............................................. 73/861.24
[58] Field of Search ............ 73/861.22, 861.23, 861.24

[56] References Cited

U.S. PATENT DOCUMENTS

| | | | |
|---|---|---|---|
| 3,719,073 | 3/1976 | Mahon | 73/861.22 |
| 3,986,796 | 12/1976 | Adler et al. | 73/861.22 |
| 4,986,134 | 1/1991 | Lew | 73/861.24 |
| 5,076,105 | 12/1991 | Lew | 73/861.24 |

Primary Examiner—Herbert Goldstein

[57] ABSTRACT

A vortex flowmeter comprises a vortex generating bluff body disposed across a flow passage, a first vortex sensing planar member disposed downstream of and parallel to the bluff body across a first half of the cross section of the flow passage, and a second vortex sensing planar member disposed downstream of and parallel to the bluff body across a second half of the cross section of the flow passage opposite to the first half thereof, wherein the leading edges of the first and second vortex sensing planar members are offset from one another by a distance generally equal to a half wave length of the sinuating streamlines created by the vortices generated by the bluff body; wherein two fluctuating electrical signals respectively generated by the first and second vortex sensing planar members are combined in such a way that the noise generated by the mechanical vibration of the flowmeter body is cancelled therebetween and an alternating output electrical signal representing the vortices is obtained.

20 Claims, 1 Drawing Sheet

VORTEX FLOWMETER WITH DUAL VORTEX SENSORS

This is a Continuation-In-Part to patent application Ser. No. 07/605,533, now U.S. Pat. No. 5,095,760, entitled "Vortex Flowmeter with Dual Sensors" filed on Oct. 29, 1990, which is a continuation-in-part to Ser. No. 07/348,602 of the same title filed on May 8, 1989 that is now abandoned, and consequently, the priority on the invention described and claimed in the present patent application is based on the aforementioned parent application, which invention was initially described and claimed in the now abandoned application Ser. No. 07/348,602.

BACKGROUND OF THE INVENTION

A well designed vortex flowmeter comprising a planar vortex sensor disposed downstream of the vortex generating bluff body of an elongated cylindrical shape measures velocity of fluid flow in a range wherein the ratio of the maximum measurable velocity to the minimum measurable velocity approaches or exceeds one hundred to one, when the mechanical vibrations of the flow conduit and flowmeter body is kept at the minimum level, which performance of the vortex flowmeter has been demonstrated by a number of different vortex flowmeters invented and designed by this inventor, which vortex flowmeters measure the velocity of air flow under the standard condition ranging from one meter per second to one hundred and fifty meters per second, and water flow ranging from 0.1 meter per second to fifteen meters per second. In order to duplicate this amazing performance of the vortex flowmeter demonstrated under laboratory conditions in actual field conditions, the vortex flowmeter must have an active noise cancelling means in processing the electrical signal representing the vortices as well as the mechanical vibrations of flowmeter body, which electrical signal is provided by the transducer included in the planar vortex sensor.

BRIEF SUMMARY OF THE INVENTION

The primary object of the present invention is to provide a vortex flowmeter comprising a vortex generating bluff body of an elongated cylindrical shape disposed across a flow passage, a first vortex sensing planar member disposed downstream of and parallel to the vortex generating bluff body across a first half of the cross section of the flow passage, and a second vortex sensing planar member disposed downstream of and parallel to the vortex generating bluff body across a second half of the cross section of the flow passage opposite to the first half thereof, wherein the leading edges of the first and second vortex sensing planar members are offset from one another by a distance generally equal to a half wave length of the sinuating streamlines created by vortices generated by the vortex generating bluff body. Two electrical signals respectively generated by two transducers respectively included in the first and second vortex sensing planar members are combined in such a way that the noise generated by the mechanical vibrations is cancelled therebetween and a resultant signal representing the vortices is obtained.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
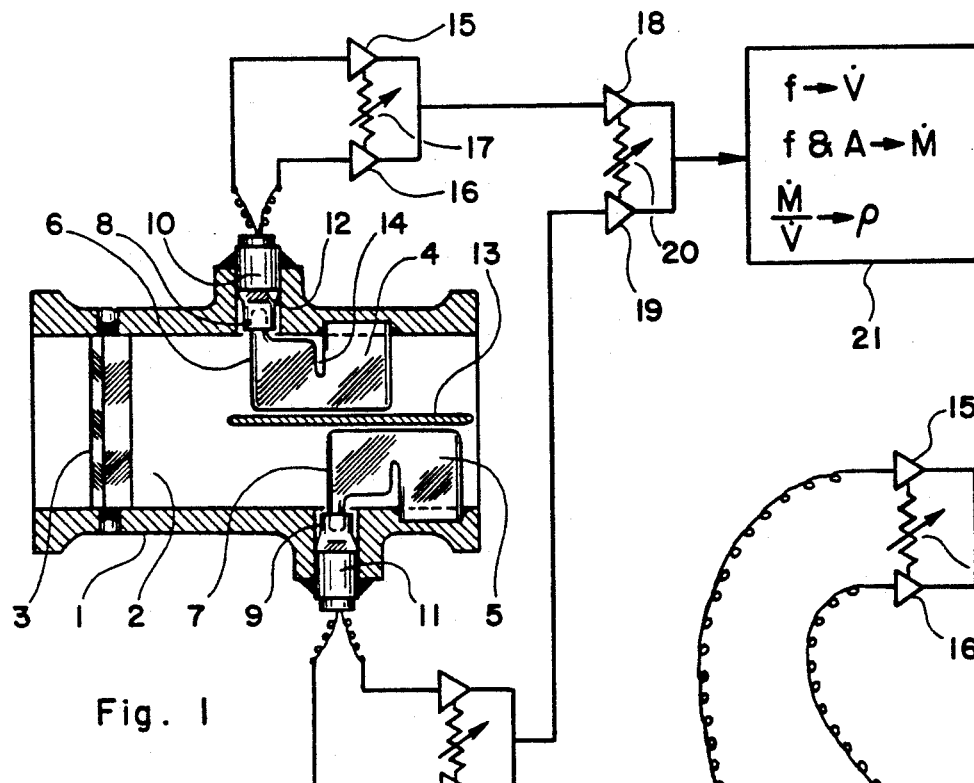
FIG. 1 illustrates a cross section of an embodiment of the vortex flowmeter of the present invention, and an embodiment of the electrical circuit processing the electrical signals generated by the vortex sensors included in the vortex flowmeter.
Figure 2:
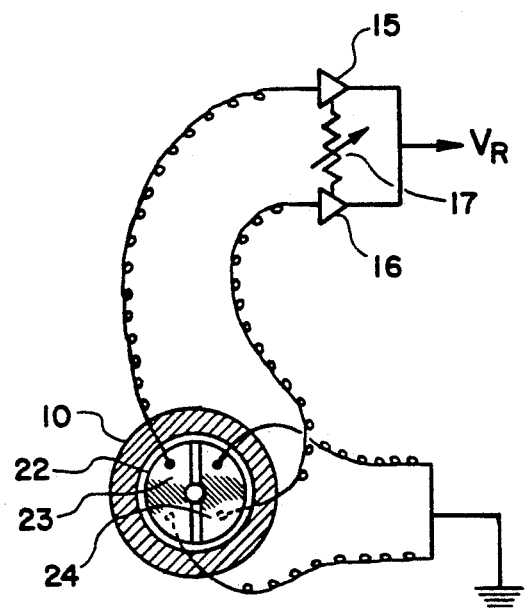
FIG. 2 illustrates an embodiment of the transducer employed in constructing the vortex flowmeter shown in FIG. 1.

In FIG. 1 there is illustrated a cross section of an embodiment of the vortex flowmeter with dual vortex sensors constructed in accordance with the principles of the present invention. The flowmeter body 1 includes a flow passage 2 extending therethrough, a vortex generating bluff body 3 of an elongated cylindrical shape disposed across a first cross section of the flow passage 2 and secured to the flowmeter body 1 at the two extremities thereof, a first vortex sensing planar member 4 disposed downstream of and parallel to the bluff body 3 across a first half of a second cross section of the flow passage 2, and a second vortex sensing planar member 5 disposed downstream of and parallel to the bluff body 3 across a second half of a third cross section of the flow passage 2 opposite to the first half of the second cross section of the flow passage 2. The two vortex sensing planar members 4 and 5 are disposed on a plane generally parallel to the central axis of the flow passage 2 in an arrangement wherein the leading edges 6 and 7 of the first and second vortex sensing planar members 4 and 5 are offset from one another by a distance equal to a noninteger times the wave length of the sinuating streamlines created by the vortices shed from the bluff body 3, which distance of offset should be generally equal to a half wave length of the sinuating streamlines in actual design of the vortex flowmeter. The vortex sensing planar members 4 and 5 are secured to the flowmeter body 1 at one extremity thereof, respectively, and deflective portions thereof such as the over-hanging extremities thereof are respectively connected to two force transmitting members 8 and 9 respectively extending from two transducer container vessels 10 and 11 anchored to the flowmeter body 1 in a rigid arrangement. The force transmitting member extends from a relatively thin end wall 12 of the cylindrical transducer container vessel 10 or 11, which end wall 12 may include a reinforcing rib disposed diametrically thereacross on a plane parallel to the central axis of the flow passage 2 and anchoring the force transmitting member 8 thereto. The two halves of the flow passage 2 respectively including the two vortex sensing planar members 4 and 5 may be separated from one another by a planar divider 13 disposed diametrically across the cross section of the flow passage 2 and secured to the flowmeter body 1 at the extremities thereof. In the particular illustrative embodiment shown, each of the two vortex sensing planar members 4 and 5 is secured to the flowmeter body 1 at the extremity of the trailing edge half thereof partially separated from the leading edge half by a slit 14. It is readily realized that the over-hanging extremity of the vortex sensing planar member opposite to the secured extremity can be anchored to the planar divider 13 by a mechanical coupling means such as a ball or plug and socket joint. In an alternative design, the vortex sensing planar member may be secured to the planar divider 13 at one extremity adjacent to the planar divider 13 instead of the extremity adjacent to the wall of the flow passage, which extremity is secured to the flowmeter body in the particular illustrative embodiment shown. Each of the two transducer container vessels 10 and 11 includes a piezo electric transducer element with two electrodes respectively connected to two amplifiers 15 and 16 with a signal level balancing means 17 therebetween as shown in FIG. 2. The two electromotive forces respectively generated by the two electrodes included in the piezo electric transducer element are combined by means of the two amplifiers 15 and 16, and the signal level balancing means 17 in such a way that the noise created by the mechanical vibrations of the flowmeter body 1 in directions parallel to the longitudinal axis of the bluff body 3 is cancelled therebetween and a resultant electrical signal representing the fluid dynamic force generated by the vortices and the inertia force of the vortex sensing planar member generated by the mechanical vibrations of the flowmeter body 1 in directions perpendicular to the longitudinal axis of the bluff body 3 is obtained. The two resultant electrical signals respectively supplied by the two transducers respectively contained in the two transducer container vessels 10 and 11 are combined by means of the two amplifiers 18 and 19 with the signal level balancing means 20 therebetween in such a way that the noise created by the mechanical vibrations of the flowmeter body 1 in directions perpendicular to the longitudinal axis of the bluff body 3 is cancelled therebetween and an alternating output electrical signal representing the fluid dynamic force generated by the vortices and experienced by the vortex sensing planar members 4 and 5 is obtained. A data processor 21 determines the volume flow rate V or the velocity of fluid moving through the flow passage 2 as a function of the frequency f of the alternating output electrical signal, as the velocity of the fluid is proportional to the frequency f of the vortex shedding from the bluff body 3, and determines the mass flow rate of the fluid M as a function of the frequency f and amplitude A of the alternating output electrical signal, as the amplitude A is proportional to the dynamic pressure of the fluid flow equal to one half of the density of the fluid times the square of the velocity of the fluid. The data processor 21 may also determine the density of the fluid as the ratio of the mass flow rate M to the volume flow rate V of the fluid.

In FIG. 2 there is illustrated a plan view of an embodiment of the piezo electric transducer element contained within the transducer container vessel 10 or 11 included in the vortex flowmeter shown in FIG. 1, which plan view is obtained by taking a cross section of the transducer container vessel along a plane parallel to the planar divider 13 included in the embodiment shown in FIG. 1. The piezo electric disc element of circular or annular shape 22 is pressed onto the relatively thin end wall 12 of the transducer container vessel 10 shown in FIG. 1. Each of the two sides of the piezo electric disc 22 has two electrodes 23 and 24 respectively disposed on the two opposite sides of a reference plane parallel to the central axis of the flow passage and dividing the piezo electric disc 22 into two equal halves, which reference plane includes the reinforcing rib of the relatively thin end wall 12 of the transducer container vessel 10 shown in FIG. 1. One electrode disposed on one side of the piezo electric disc 22 and located on one side of the reference plane, and another electrode disposed on the other side of the piezo electric disc 22 and located on the other side of the reference plane are respectively connected to the two amplifiers 15 and 16 with the signal level balncing means 17, which combination provides one of the two resultant electrical signal $V_R$, while those electrodes not connected to the amplifier 15 or 16 are grounded. In an alternative design, two electrodes disposed on the same side of the piezo electric disc element and respectively located on the two opposite sides of the reference plane may be respectively connected to an inverting amplifier and a noninverting amplifier with the signal level balancing means therebetween. Other types of transducers such as capacitive, resistive, or optoelectric transducer may be employed in place of the piezo electric transducer shown and described.

Figure 3:
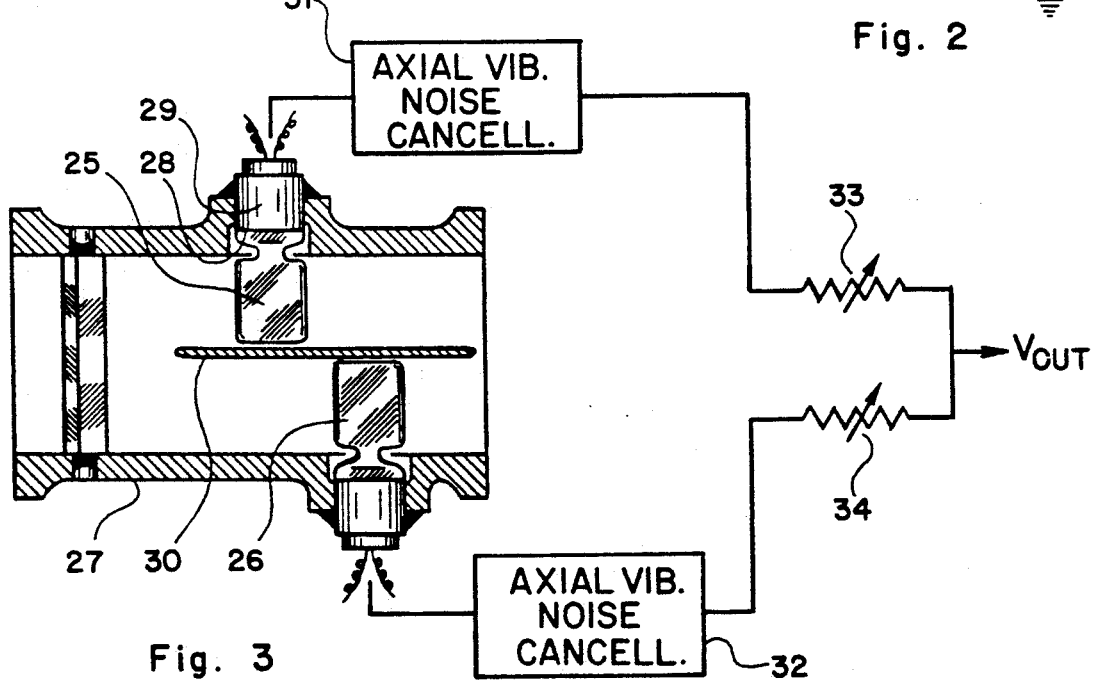
FIG. 3 illustrates a cross section of another embodiment of the vortex flowmeter of the present invention.

In FIG. 3 there is illustrated a cross section of another embodiment of the vortex flowmeter with dual vortex sensors of the present invention. This embodiment working on the same principles as those described in conjunction with the embodiment shown in FIG. 1 has essentially the same elements having the same constructions as those included in the embodiment shown in FIG. 1 with one exception. The vortex sensing planar members 25 and 26 employed in this embodiment are not secured to the flowmeter body 27 as each of the two vortex sensing planar members extending from the relatively thin end wall 28 or from the reinforcing rib of the relatively thin end wall of the transducer container vessel 29 is fused to the relatively thin end wall 28 or to the reinforcing rib thereof and, consequently, the vortex sensing planar member is supported thereby. As a modification in design, the over-hanging extremity of the vortex sensing planar member adjacent to the planar divider 30 may be anchored to the planar divider 30 by means of a mechanical coupling such as the ball or plug and socket coupling. Each of the axial vibration noise cancelling circuits 31 and 32 includes the two amplifiers and a signal level balancing means as shown in FIG. 1. In combining the two resultant electrical signals respectively supplied by the two axial vibration noise cancelling circuits 31 and 32, a simple resistor means including one or both of the two resistors 33 and 34 may be employed in place of the two amplifiers 18 and 19 with the signal level balancing means 20 included in the embodiment shown in FIG. 1.

While the principles of the present invention have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the inventions, in which an exclusive property or priviledge is claimed, are defined as follows:

1. An apparatus for measuring flow rate of fluid comprising in combination:
   a) a body including a flow passage therethrough;
   b) a vortex generating cylindrical member disposed across a first cross section of the flow passage and secured to the body at at least one extremity thereof;
   c) a first vortex sensing planar member disposed generally parallel to to the vortex generating cylindrical member across a first half of a second cross section of the flow passage on a plane generally parallel to the central axis of the flow passage, said first vortex sensing planar member including a first transducer means converting forces experienced by the first vortex sensing planar member to a first fluctuating electrical signal; and
   d) a second vortex sensing planar member disposed generally parallel to the vortex generating cylindrical member across a second half of a third cross section of the flow passage opposite to the first half of the second cross section of the flow passage on a plane generally parallel to the central axis of the flow passage, said second vortex sensing planar member including a second transducer means converting forces experienced by the second vortex sensing planar member to a second fluctuating electrical signal; wherein leading edges of the first and second vortex sensing planar members are offset from one another by a distance equal to a noninteger times the wavelength of sinuating streamlines created by vortices generated by the vortex generating cylindrical member; and
   e) means for combining the first and second fluctuating electrical signals in such a way that noise generated by mechanical vibrations of the body is cancelled therebetween and an alternating output electrical signal representing the vortices is obtained.

2. A combination as set forth in claim 1 wherein said combination includes means for determining volume flow rate of fluid moving through the flow passage as a function of frequency of the alternating output electrical signal.

3. A combination as set forth in claim 1 wherein said combination includes means for determining mass flow rate of fluid moving through the flow passage as a function of frequency and amplitude of the alternating output electrical signal.

4. A combination as set forth in claim 1 wherein said combination includes means for determining density of fluid moving through the flow passage as a ratio of mass flow rate of the fluid determined as a function of frequency and amplitude of the alternating output electrical signal to volume flow rate of the fluid determined as a function of the frequency of the alternating output electrical signal.

5. A combination as set forth in claim 1 wherein said offset distance between the leading edges of the first and second vortex sensing planar members is generally equal to half wave length of the sinuating streamlines created by the vortices.

6. A combination as set forth in claim 5 wherein said combination includes means for determining volume flow rate of fluid moving through the flow passage as a function of frequency of the alternating output electrical signal.

7. A combination as set forth in claim 5 wherein said combination includes means for determining mass flow rate of fluid moving through the flow passage as a function of frequency and amplitude of the alternating output electrical signal.

8. A combination as set forth in claim 5 wherein said combination includes means for determining density of fluid moving through the flow passage as a ratio of mass flow rate of the fluid determined as a function of frequency and amplitude of the alternating output electrical signal to volume flow rate of the fluid determined as a function of the frequency of the alternating output electrical signal.

9. A combination as set forth in claim 1 wherein each of the first and second vortex sensing planar members is supported by the body at at least one extremity thereof, and a deflective portion of said each of the first and second vortex sensing planar members is connected to the transducer means secured to the body.

10. A combination as set forth in claim 9 wherein said first and second halves of the cross section of the flow passage are separated from one another by a planar divider member.

11. A combination as set forth in claim 9 wherein said offset distance between the leading edges of the first and second vortex sensing planar members is generally equal to half wave length of the sinuating streamlines created by the vortices.

12. A combination as set forth in claim 9 wherein said combination includes means for determining volume flow rate of fluid moving through the flow passage as a function of frequency of the alternating output electrical signal.

13. A combination as set forth in claim 9 wherein said combination includes means for determining mass flow rate of fluid moving through the flow passage as a function of frequency and amplitude of the alternating output electrical signal.

14. A combination as set forth in claim 9 wherein said combination includes means for determining density of fluid moving through the flow passage as a ratio of mass flow rate determined as a function of frequency and amplitude of the alternating output electrical signal to volume flow rate of the fluid determined as a function of the frequency of the alternating output electrical signal.

15. A combination as set forth in claim 1 wherein each of the first and second vortex sensing planar members extends from and is supported by the transducer means affixed to the body.

16. A combination as set forth in claim 15 wherein said first and second halves of the cross section of the flow passage are separated from one another by a planar divider member, and over-hanging extremity of said each of the first and second vortex sensing planar members is anchored to the planar divider member.

17. A combination as set forth in claim 15 wherein said offset distance between the leading edges of the first and second vortex sensing planar members is generally equal to half wave length of the sinuating streamlines created by the vortices.

18. A combination as set forth in claim 15 wherein said combination includes means for determining volume flow rate of fluid moving through the flow passage as a function of frequency of the alternating output electrical signal.

19. A combination as set forth in claim 15 wherein said combination includes means for determining mass flow rate of fluid moving through the flow passage as a function of frequency and amplitude of the alternating output electrical signal.

20. A combination as set forth in claim 15 wherein said combination includes means for determining density of fluid moving through the flow passage as a ratio of mass flow rate of the fluid determined as a function of frequency and amplitude of the alternating output electrical signal to volume flow rate of the fluid determined as a function of the frequency of the alternating output electrical signal.

* * * * *